Aug. 9, 1927.
S. B. WHITESIDE
ICE CREAM HANDLING APPARATUS
Filed July 6, 1925
1,638,134
2 Sheets-Sheet 2
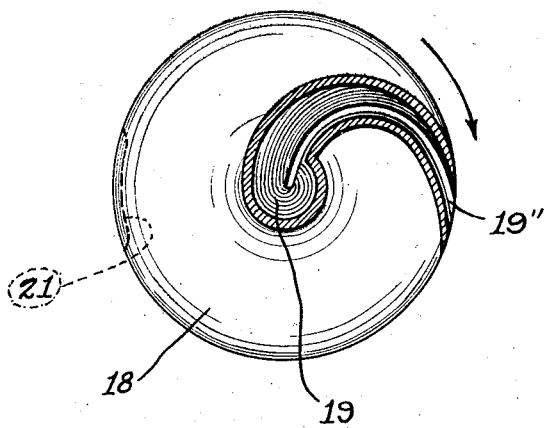
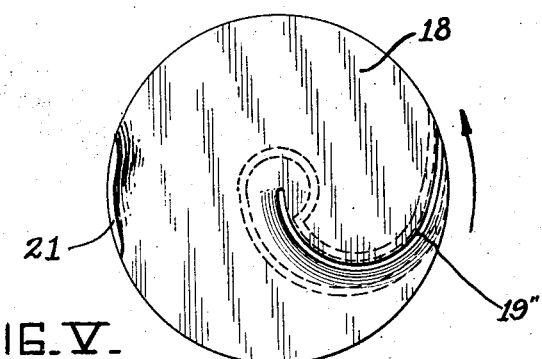
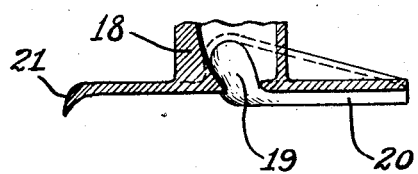
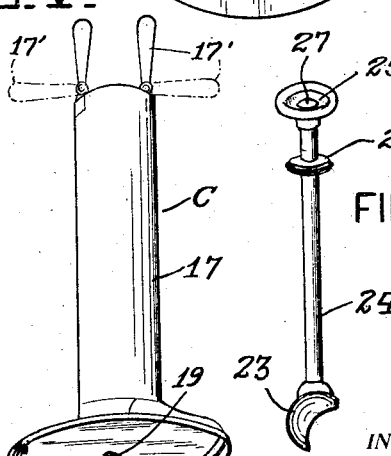
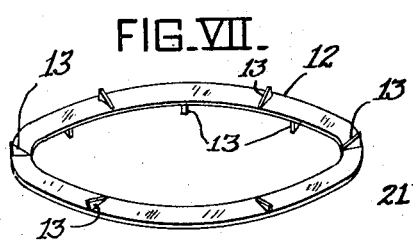
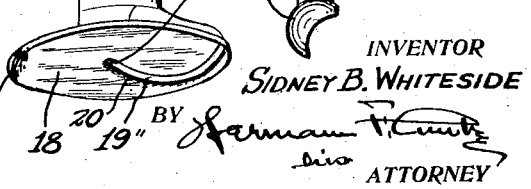
INVENTOR
SIDNEY B. WHITESIDE
BY
ATTORNEY Patented Aug. 9, 1927.

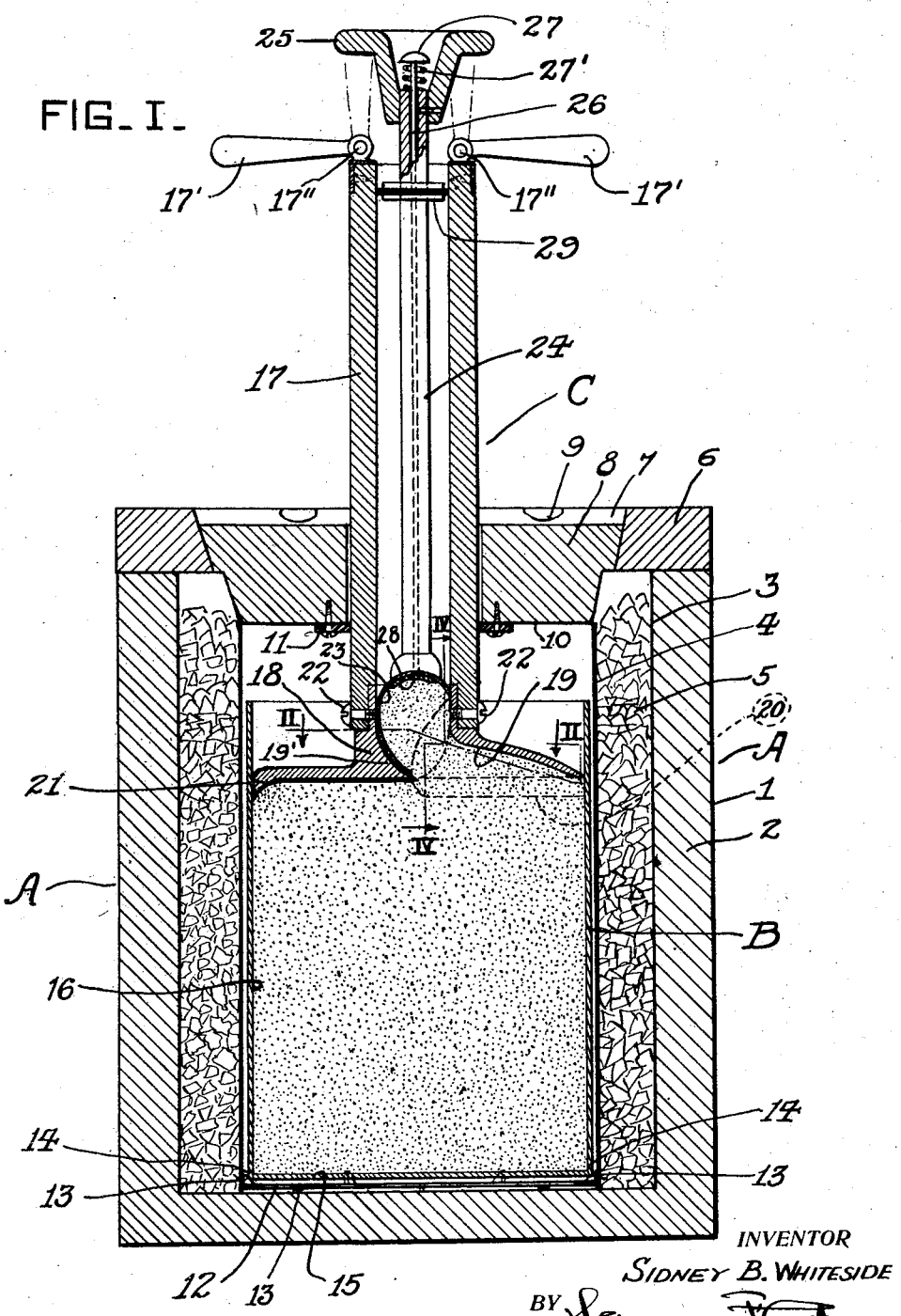

1,638,134

UNITED STATES PATENT OFFICE.

SIDNEY B. WHITESIDE, OF NEW YORK, N. Y.

ICE-CREAM-HANDLING APPARATUS.

Application filed July 6, 1925. Serial No. 41,730.

This invention relates to apparatus or devices for the handling of ice cream, and more particularly for aiding the preservaton of ice cream in the proper degree of frozen condition for economy, and also for dispensing of ice cream with the avoidance of loss of refrigeration and for economy of dispensing. Among the objects attending the use of the invention are the reduction in cost of refrigeration whether ice, electrical, or otherwise, the prevention of access of foreign matter to the cream, cleanliness and hygienic handling of the cream and dispensing, providing means for uniformly dispensing predetermined measured quantities, and other objects as will appear from the more detailed description hereinafter set forth.

A specific embodiment of my invention is shown in the accompanying drawings, in which:

Fig. I is a vertical section through the axis of an ice cream can and its insulated refrigerating container and the apparatus for closure and removal of the cream for dispensing.

Fig. II is a cross-section on line II—II in Fig. I, through the manipulating cover.

Fig. III is a bottom view of the manipulating cover.

Fig. IV is a cross-section of the manipulating cover transverse to the section in Fig. I, on the line IV—IV of Fig. I.

Fig. V is the apparatus in perspective, when removed from the can.

Fig. VI is a side view in perspective of the dispensing tool cooperating with the part of the apparatus shown in Fig. V; Fig. VI$^a$ is a modified dispensing tool.

Fig. VII is a can anchor-plate.

The container A may be a container for an individual can B, or may be an elongated container adapted to enclose a plurality of cans of ice cream, such as B. As an individual container it may comprise an outer wall I, preferably of metal, enclosing a wall 2, or space filled with insulation such as cork or kapok, with an interior wall 3 contiguous with the bottom to form a watertight well, inside of which a cylindrical wall 4, also watertight, is supported to form an annular space 5 for refrigerant, such as the usual cracked ice and salt, piping or refrigerating gas. An annular cover 6 fits on top of the insulated top wall of the container, having a hole preferably beveled to accommodate a readily removable cover with a top plate 7 and a body of insulated material 8, with manipulating recesses 9, and having a bottom plate 10 to which a collar plate or gasket 11 is attached to form a close fit, substantially airtight, for engagement with the cylinder of the handling device C. A resting-plate 12 fits into the bottom of the cylindrical container wall 4 with a plurality of teeth 13—13, to provide for engagement with the lower edge 14, preferably reinforced or having a protruding beading formed with the bottom 15 of the ice cream can B, which is formed with the usual cylindrical lateral wall 16, and is shown containing ice cream.

The form of manipulating apparatus or handling device as herein illustrated, comprises a tubular shank 17 to the bottom of which is attached a head or ice cream cover 18, closely fitting within the walls of the can B on top of the contained ice cream. The tubular shank 17 is preferably made of material of low heat conductivity and constitutes the main part of the dispensing apparatus C, in conjunction with the cooperating dispensing tool within it, hereinafter described.

The tubular shank of the handling device has handles 17'—17' at its top, preferably pivoted as at 17", whereby the handles may be articulated to a position, shown dotted, in order to permit the shank to pass through the container cover 7 and form a close fit with washer 11. At the other end of the tubular shank 17 the manipulating cover closure 18 is secured, as by suitably insulated means 22, to form a rigid connection so that cover or closure 18 may be rotated by means of the handle 17', while the metallic closure or head 18 rests on the top surface of the ice cream, and is of such material and has a suitable inner surface to assure its turning smoothly within the can B on the top surface of the ice cream. This head or closure has a recess from its centre to the periphery at one side, with an inclined wall 19, and extending spirally from the centre, with a lip 20 parallel with and projecting beyond the bottom surface of the head with a connecting edge sufficiently sharp to imbed into the surface of the ice cream and deflect the ice cream upwards into the cavity 19, when the handling device C is rotated. At the diametrically opposite side of the head a projection 21 serves to scrape the ice cream away from the wall as the device C is rotated, in order to assure bringing the topmost ice cream in position for engagement with the raising lip 20. Other or differently positioned scraper points 21 may be used. Adjacent the lip 20 a slot 19'' permits the upward passage of the film or shaving of ice cream into the space formed by the wall 19, and the slope of this wall directs the ice cream so ejected by the lip to flow or crowd toward the centre of the handling device C and emerge from the head 18 into or toward the hollow centre or core of the shank 17.

The tool or dipper for dispensing has at its lower end a scoop 23 attached to a shaft 24 at the top of which is the handle 25. Through the shaft a rod 26 spring-held upward by spring 27', engaging a knob 27, while at the other extremity an ejector-plate 28 normally engages with the surface of the dipper end 23. This dipper is formed to engage the sloping surface 19' of the interior of the head or closure 18, but terminates adjacent the centre or axis so as not to interfere with the flow of the ice cream to the interior of the dipper, while the upper portion of the dipper is completely circular to an extent necessary to form a close working fit with the bore of the shank 17, and is preferably hemispherical, or suitably rounded so as to prevent jamming in the bore. Near the top of the shaft 24 a collar 29 forms a loose or easy fit stuffing ring, to insulate the bore or well of the handling device, thereby adding to the reduction of chances for heat transfer.

While the head 18 is shown in this form as completely covering the top surface of the ice cream, it will be noted that the cover 7 closes the entire container and prevents top radiation when this cover 7 is in place, so that the space between it and the head 18 is kept cold, thereby minimizing the chance of melting or the softening of the top surface of ice cream. By avoiding the necessity of any removal of cover 7, the saving from loss of heat by radiation is effected, and the head 18 need not cover the entire surface of the ice cream and may present an interrupted face, but is made in such fashion as to meet the requirements of proper engagement with the mass of ice cream for easy manipulation and the raising of the cream progressively as more fully explained hereinafter. Likewise, the form of the spiral slot 19'', and the depending cutting edge 20 is such that the rotation of the head will draw the extremity of the knife and the neighboring periphery of the disc in close contact with the adjacent side of the can wall, so as to scrape clean in effecting the removal. The extent of projecting cutter 20 below the adjacent head surface may be varied so that the volume of ice cream "shaved" at different distances from the centre will cause an easy flow of the cream to the centre and up the bore of the shank, and in some cases I may force the ice cream up the hollow shank to any extent desired as by measured distance suitably calibrated, and then insert a dipper fitting the sides, or work a dipper into the cream from the top. I prefer, however, to first insert the desired size of dipper, and then rotate the head and fill the dipper and remove it.

The devices and all parts, it will be noted, are readily accessible for cleaning, and without trouble can be kept in sanitary condition, while they can also be disassembled at will for readjustment or extraordinary cleaning at any time, without difficulty.

It will thus be seen that this invention involves means which, as illustrated, comprise a handling apparatus C which at the same time forms a cover for the ice cream in a can from the time it is put into position for dispensing and is not removed until all of the ice cream has been extracted from the can. Cooperating with this tool is the dispensing ladle or dipper which is actuated in such manner as to seal or form a stopper for the only aperture in the closure, and to permit at will the dipping of a predetermined portion of ice cream and removing such for dispensing without opening the ice cream can, or without opening the container surrounding the can, and therefore precluding the heat radiation from the ice cream in the can.

The operation of this invention comprises the insertion of a full ice cream can, as B, into the container or cabinet, removing the cover from the ice cream can and immediately nesting the improved handling apparatus closure head onto the top of the ice cream, thereupon turning up handles at the top of the apparatus and sliding the cabinet cover 7 over the outside of the shank 17 whereupon the container cover 7 at once closes the container against heat radiation, and the closure remains without the necessity of another opening until the entire ice cream contents of the can B have been extracted. This thus results in immediately insulating the ice cream when its delivery cover has first been removed, and preserving the refrigerating means between the container or cabinet to its maximum extent. In addition to this saving of refrigeration, the ice cream in the transporting can is always covered up and sealed from outside dirt or gas, and sanitarily yields the obvious advantages of entirely preventing contamination.

For the actual dispensing of ice cream, the retractable dipper may be made in various forms and various sizes. As shown, the approximately egg-shaped fragmentary shell is inserted as in the position in Fig. I, with suitable means on the handle to assure the open end of the dipper registering with the delivering space of the spiral passage through which the ice cream shaved from the top surface is delivered by means of the lip 20 and through the slot 19″. The handling apparatus is then turned until the dipper is filled, and contents rise due to the pressure of the ice cream, during which operation any air in the dipper passes out to the bore of the shank 17, in view of the usual loose fit in the parts of implements of this character, or through small vents, and as soon as the slight rise or tendency to rise is noted by the attendant, the handle 25 of the dipper is turned half round, thereby cutting off the measured quota of ice cream in the dipper end, severing it or breaking the seal with the bottom and permitting it to be readily withdrawn from the interior of the shank 17, after which slight pressure on the knob 27 actuates the ejector and delivers the contents of the dipper as desired. As shown in Fig. VI$^a$, a longer dipper extends upwards, but with a similar lower end and with walls slightly more than semi-cylindrical, and such elongated dipper ends may be made of predetermined contents such as a pint or a quart, or any normal dispensing quantities, and when the rotation of the shank 17 fills the dipper it is projected upward, the rotation of the shank stopped and the dipper removed. With such elongated dippers a substantial extent of wall is provided to guide the dipper through the bore of the shank 17, so that the upper end of such longer dippers need not be rounded but may terminate in a flat end so that the core of ice cream drawn out for dispensing will be cylindrical with the end squared adapted to fit with maximum economy into suitable containers.

The use of this invention minimizes the chance of radiation after a service can of ice cream has been opened at the dispensing place, thus materially reducing the cost of keeping ice cream in salable condition; it forms an air-lock for the top of the ice cream service can through which air-lock the removal of ice cream can be readily performed at will, and permits the removal of measured quantities as desired, with different sizes of dippers adapted to be used at will; and assures a uniform extraction of the ice cream in its normal condition, preventing entirely the paddling, but, on the contrary, delivering the cream into the dispensing dipper instead of forcing the dipper into the cream, thus assuring substantially the same structural texture of the dispensed article as it has originally been frozen into the service can. During the operation it will be understood that the contact of the closure and cream removing head with the top of the mass of ice cream might tend to turn the entire service can, and this is prevented by any suitable means of locking the can against rotation, such as shown by the footring interengaging the insulated container and the bottom of the service can.

I claim:—

1. An ice cream dispensing device comprising a tubular shank adapted to move axially through a radiation resisting cover of a cabinet or like container for ice cream cans, a head on said tubular shank adapted to engage and raise progressively portions of the ice cream from a mass, a dipper adapted to pass through the bore of said tubular shank, and means for manipulating said dipper to extract ice cream portions from the mass without exposing the mass of ice cream to radiation or contamination.

2. An ice cream dispensing device adapted to pass through a portion of a radiation insulated cabinet or container and having air-sealed connections to prevent radiation during dispensing, having a substitute head to engage the mass of ice cream and to feed the same upon the manipulation of the device into a cavity in the head while the mass of ice cream remains sealed, a tool or dipper adapted to be inserted through said device at will to remove portions of the ice cream.

In testimony whereof, I have signed my name to this application this 2 day of July, 1925.

SIDNEY B. WHITESIDE.